March 12, 1929.   C. MATZEL   1,705,128
PROCESS OF PRODUCING ZINC
Filed July 13, 1926
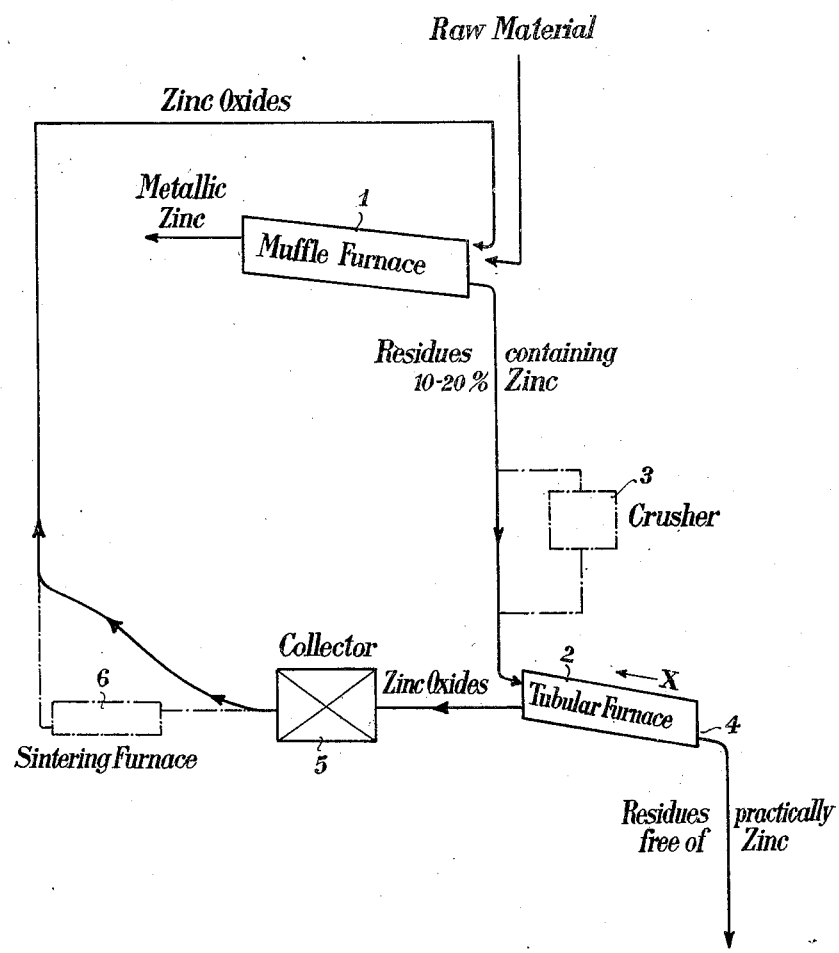

Patented Mar. 12, 1929.

1,705,128

UNITED STATES PATENT OFFICE.

CONRAD MATZEL, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY.

PROCESS OF PRODUCING ZINC.

Application filed July 13, 1926, Serial No. 122,205, and in Germany July 20, 1925.

My invention relates to the production of zinc from zinciferous ores and other materials containing zinc.

A well known metallurgical process commonly used for the recovery of zinc comprises the distilling of the zinciferous materials, the latter being heated in a muffle furnace or in an electric furnace.

In practice it has been found out that the recovery of zinc by distillation can be carried out with economy only down to a limited degree viz a certain minimum content of zinc in the charge which mostly ranges between 10 and 20 percent of zinc.

By continuing to distil the material beyond a critical minimum zinc content a relatively large quantity of fuel is needed which is out of proportion to the relatively small quantity of zinc recovered, and which renders the further recovery of zinc utterly uneconomical.

In addition there are other drawbacks and irregularities, caused by the gangues of the ores, as known to those skilled in the art.

The object of this invention is to overcome the drawback attached to the recovery of zinc solely by distillation, and to design a modified and improved metallurgical process by which the recovery of zinc can be carried on in a highly economical way down to a very small zinc content in the materials under treatment.

With this and other objects in view I have invented a new process of treating zinciferous ores and other metallurgical materials, the essential features of which are outlined in the appended claim.

The nature and scope of my invention will be more fully understood from the following specification taken together with the accompanying drawing indicating diagrammatically the various stages of the new process.

According to this invention the zinciferous material is first heated in a muffle furnace 1, being subjected to a distilling action until the zinc content of the charge is reduced to about 10–20%, according to the particular nature and composition of the ores under treatment. The residues of the charge are then removed from the muffle furnace and are charged—either immediately or after having been appropriately comminuted by a crushing or grinding machine 3—into a rotary tubular furnace 2, thru which a current of air is blown in the direction $x$, viz oppositely to the direction in which the material under treatment slowly moves thru the furnace as for example in Patent No. 1,618,204. This current of air is, however, only sucked through the furnace so that it comes into contact only with the upper surface of the charge as it rolls over and over in the furnace. Such a furnace and its mode of operation are shown in Johannsen Patent No. 1,618,204, patented Feb. 22, 1927.

Reducing material may be conveniently introduced together with the charge. A flame may be applied for heating the latter to the temperature appropriate for starting the reduction and volatilizing the zinc, and for sustaining said temperature throughout the whole treatment.

The application of a flame in the tubular furnace 2 may be interrupted after the reduction process is in full working order. The following reactions will then take place within and without the charge

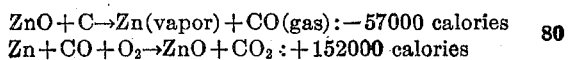

$ZnO + C \rightarrow Zn(vapor) + CO(gas) : -57000$ calories
$Zn + CO + O_2 \rightarrow ZnO + CO_2 : +152000$ calories There results therefore that a considerable excess of heat is obtained by the combustion of the zinc vapor in the furnace itself, so that by the summation of both reactions this excess of heat is obtained by the subsequent combustion of the CO to $CO_2$. In this manner it becomes possible by the use of the zinc, so to speak, as an active catalyzer, to obtain an extended combustion of the carbon contained in the retort residues, without necessitating any blowing of air through the charge. Blowing air through the charge has the disadvantage that a partial sintering together of the charge takes place and interferes with the vaporization of the zinc. These disadvantages are obviated by this invention. The process has the further economical advantage that it can be continuously carried out in an apparatus having a large throughput.

It will be noted by those carrying my invention into practice that by the combustion alone of the gases and vapors issuing from the charge in the tubular furnace in many cases sufficient heat is generated for keeping this reduction process going on effectively.

The residues of the charge which has passed thru the tubular rotary furnace are discharged at its bottom end 4 and will be found to be practically free of zinc, while the volatilized oxides of zinc are recovered in a collector 5.

As indicated in the annexed diagram the recovered oxides may then be returned for further treatment into the muffle furnace 1 —either directly or after having been conveniently subjected to a sintering action in a sintering plant 6.

Summarizing and commenting on the above described improved treatment of zinciferous materials the latter comprises in combination a distilling process and a zinc oxide process by which a considerably larger quantity of metallic zinc can be recovered from the raw material than it was possible heretofore.

The residues of the zinciferous material discharged from the reducing furnace 2 are practically free of zinc while their content of other commercially valuable constituents as e. g. refractory heavy ores and precious metals is increased conformably, whereby the reclaiming of said constituents is rendered easier and more remunerative.

Various changes and modifications may be made in carrying out above described improved process in practice without departing from the spirit and the leading ideas of my invention.

What I claim is:

A method of treating zinciferous material which comprises subjecting the material mixed with carbon to a retort distillation process which is carried only so far as to reduce the zinc content of the charge to from 10–20%, then subjecting the carbon-containing residue to a continuous volatilizing treatment in a heated rotary furnace in which, during the continued rolling over of the charge, the zinc is reduced within the layer of material and driven out in vapor form and, in the presence of the oxidizing atmosphere maintained in the furnace, again oxidized together with the other reaction products, whereby an extensive combustion of the carbon in the residues is obtained and an adequate supply of heat is maintained, and then recovering the zinc oxide thus produced.

The foregoing specification signed at Berlin, Germany, this 29th day of June, 1926.

CONRAD MATZEL.